April 23, 1957 F. H. GUTH 2,790,092
ALTERNATOR DRIVE STARTING CONTROL
Filed June 9, 1955
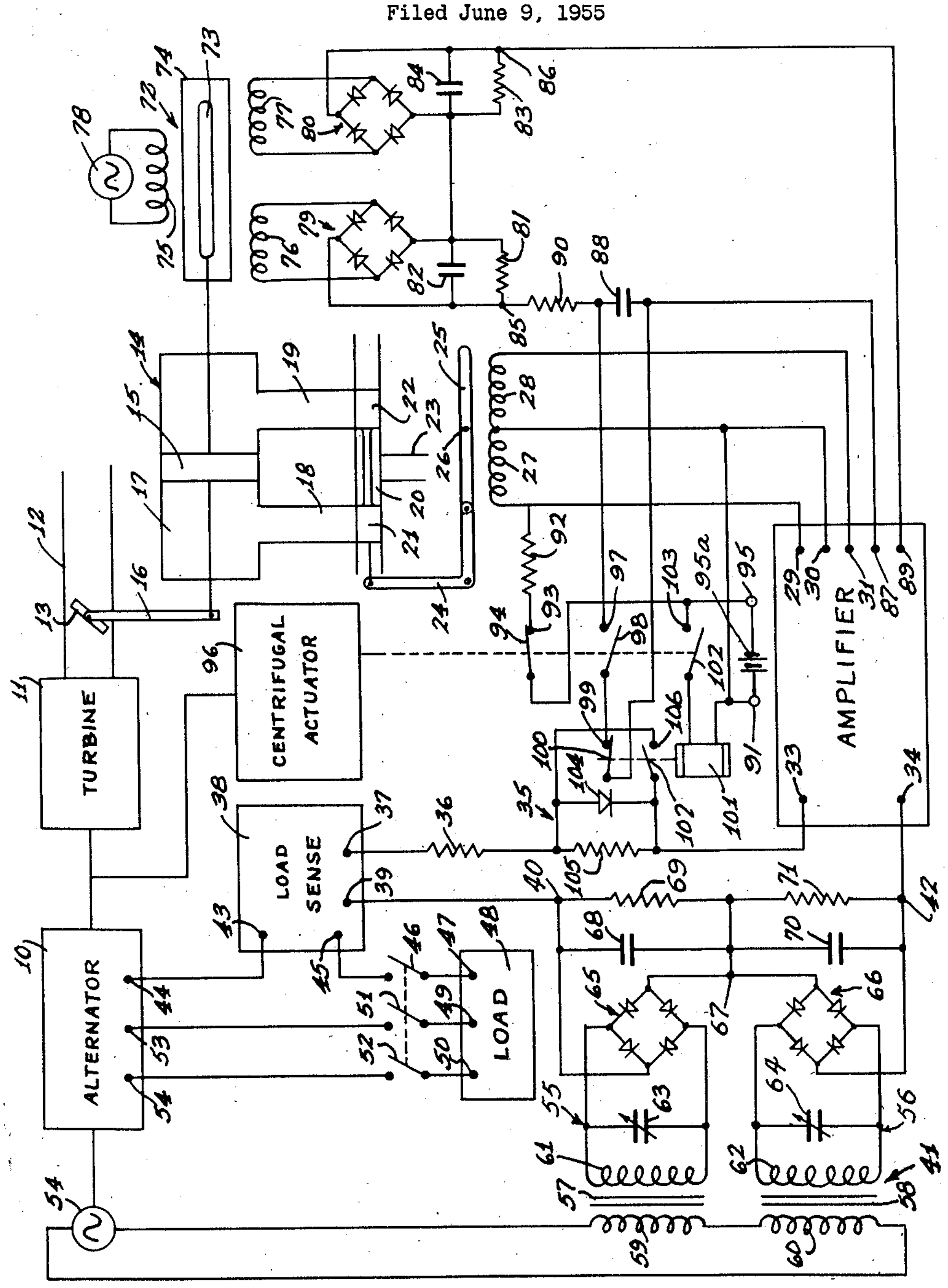
Inventor
FRED. H. GUTH
by Hill, Sherman, Meroni, Gross & Simpson Attys.

United States Patent Office 2,790,092

Patented Apr. 23, 1957

2,790,092

ALTERNATOR DRIVE STARTING CONTROL

Fred H. Guth, Warrensville Heights, Ohio, assignor to Thompson Products, Inc., Cleveland, Ohio, a corporation of Ohio

Application June 9, 1955, Serial No. 514,351

17 Claims. (Cl. 290—40)

This invention relates to an alternator drive starting control and more particularly to a control for an alternator drive arranged to obtain rapid acceleration of an alternator to the desired speed without overshoot and without impairing accurate speed regulation after the starting operation.

This invention may be applied to any drive system in which it is desired to rapidly accelerate a device to an operating speed, but may be applied with particular advantage to a drive system for an aircraft alternator. In such a system, an alternator is driven by a turbine with the drive torque applied to the alternator being controlled by controlling a valve in the fluid intake to the turbine. For this purpose, an electro-mechanical transducer is provided which may directly operate the valve but preferably controls control valve means of a fluid-actuated system to control movement of a piston or the like mechanically coupled to the valve in the turbine air intake.

The electro-mechanical transducer is coupled to the output of an amplifier having an input connected to speed sensing means coupled to the alternator, to obtain a constant speed irrespective of variations in load, input pressure etc.

The speed sensing means may preferably respond to an alternating current signal derived directly from the alternator, or from a generator driven by the alternator. To obtain an output signal indicative of speed or frequency a pair of resonant circuits are utilized tuned respectively to frequencies above and below the desired frequency, with the output from the resonant circuits being compared to indicate the direction and the magnitude of deviation of frequency from the desired frequency.

To improve the speed of response and stability of the operation of the system, a displacement sensing system is provided to sense the displacement of the valve and obtain an electric output signal varying according to displacement of the valve. This signal may be amplified and applied to the electro-machanical transducer, either through the same amplifier coupled to the speed sensing means or through a separate amplifier.

The signal output of the displacement sensing system, which is amplified and applied to the transducer, may have a polarity and magnitude corresponding to the direction and amount of displacement of the valve from a neutral position. With such a signal, a "proportional" control is obtained with a high speed of response and stable operation. However, such a "proportional" control is not always satisfactory, in that the signal from the displacement sensing system is balanced against the signal from the speed sensing system and the drive speed may deviate from the desired speed with movement of the control valve out of its neutral position. For this reason, a differenetiating circuit may be provided between the displacement sensing system and the transducer means which will instantaneously transmit a signal on any displacement of the control valve, so as to obtain the advantages of "proportional" control, but after the control valve is in any given position for a substantial length of time, the differentiating circuit will have no output, so that the speed of the alternator is not dependent upon the position of the control valve. With the provision of this differentiating circuit, a combined proportional and integral or speed-resetting control is obtained.

With a system such as thus far described, it is possible to maintain the speed of the alternator constant within very narrow limits with variations in load, input pressure and other factors over wide ranges. However, in initiating operations of such a system, various difficulties are encountered, it being the general object of this invention to provide a starting control eliminating such difficulties.

One difficulty that may be encountered is that the control valve in the intake of the turbine may not be in a fully opened position for the starting operation so that maximum torque is not applied to the alternator, and the alternator is not accelerated as rapidly as would be desirable. This is particularly true with a speed sensing system such as above described which is responsive to an alternating current signal derived from the alternator. Such a signal is, of course, generally proportional to the speed of rotation of the alternator.

According to this invention, means are provided for effecting movement of the control valve to an open or maximum torque position at alternator speeds below a certain value, which may be somewhat lower than the desired speed of rotation of the alternator. Such means may preferably comprise a switch for applying a signal to the transducer for effecting movement of the control valve to an open position, and speed-responsive means such as a centrifugal device coupled to the alternator for moving the switch to an inoperative position when alternator speed reaches a certain value.

The combined proportional plus integral control as above described will rapidly and accurately return the alternator speed to the desired speed when small speed errors occur. However, with large speed errors, such as occur during starting conditions, the combined proportional plus integral control is not as efficient as would be desirable. In particular, the integral control action is slower than that of proportional action and, in addition, integral control action does not take place until the error signal has reversed its polarity. When the alternator is rapidly accelerated from a stop condition to a desired speed, the integral control action would not be effective until after the speed exceeds the proper speed with the result that extremely large overspeed transients may occur during rapid starts.

According to this invention proportional control only is used in the starting operation, so that the alternator can be rapidly accelerated to a speed close to the proper speed, after which proportional plus integral control is utilized to achieve highly accurate speed regulation.

As above pointed out, the operation may be changed over from proportional control to proportional plus integral control by providing a differentiating circuit between the output of the displacement sensing system and the electro-mechanical tranducer used to control the position of the control valve or other torque regulating element. Accordingly, to change from proportional plus integral control to proportional control, such differentiating means may be deactivated. In the case in which the differentiating circuit comprises a series capacitor such may be accomplished by the simple expedient of shorting out the series capacitor.

Under proportional control, the transducer is so controlled by the displacement sensing system as to tend to return the control valve to a neutral position. Such a position should be preset at a point such that the valve will not move too far closed under low input pressure conditions nor too far open under high input pressure conditions. The motion of the valve is, of course, modified by the signal from the speed sensing system which attempts to move the valve somewhat open from the position dictated by the displacement sensing system, for all speeds less than the set speed. Under low input pressure conditions, this is satisfactory since the control valve must move proportionately further open in order to maintain a steady safe speed less than the set speed. Under high input pressure conditions, however, if the control valve remains open too long, turbine acceleration will be too great and severe overspeed will result.

According to this invention, the output of the speed sensing system is modified during the starting operation to decrease the response of the system to output signals indicating a speed less than the set speed.

For this purpose, a rectifier, such as a diode, is connected in series between the output of the speed sensing system and the amplifier, with the polarity of the diode being such as to pass signals indicating speeds greater than the set speed, while blocking signals indicating speeds less than the set speed. The diode may be shunted by a resistor having a resistance low enough to permit starts at low input pressures and still prevent overshoot at high input pressures. It should be noted that since the diode conducts signals indicating speeds greater than the set speed, the arrangement permits maximum closing action to hold speed overhoots.

After the starting operation, the diode rectifier is shorted out and the differentiating circuit between the displacement sensing system and the transducer is put into operation, so that normal speed regulation will occur. According to a specific feature of the invention, such may be accomplished by means of a time delay relay arranged to act a certain time period after the speed reaches a certain speed below the set speed. Thus the entire starting operation is automatic.

This invention comtemplates other and more specific objects, features and advantages which will become more apparent from the following detailed description taken in conjunction with the accompanying drawing in which the single figure is a diagrammatic illustration of a drive control system constructed according to the principles of this invention.

In the system of this invention, an alternator 10 is driven by a turbine 11 having an input air duct 12 with the torque applied to the alternator 10 being controlled by a valve 13 in the air intake duct 12. The valve 13 is controlled by fluid-actuated means generally designated by reference numeral 14 which comprises a piston 15 coupled to an arm 16 connected to the valve 13. The valve 15 is movable in a cylinder 17 and a pair of conduits 18 and 19 communicate with the cylinder 17 on opposite sides of the piston 15, the conduits 18 and 19 also communicating with spaced portions of a passageway 20 in which a pair of valve members 21 and 22 are disposed with a fluid inlet 23 communicating with the passageway 20 at a point intermediate the valve members 21 and 22. The valve members 21 and 22 are connected together and to one arm of a lever 24 having a second arm connected to an armature 25 which is pivotal about an axis 26. A pair of coils 27 and 28 are disposed and in inductive relation to the armature 25.

In operation, when the coil 27 is energized to an extent greater than the coil 28, the armature 25 will pivot in a counter-clockwise direction to pivot the lever 24 in a clockwise direction and move the valve members 21, 22 to the right which will allow fluid under pressure from the inlet 23 to flow through the conduit 19 into the cylinder 17 on the right side of the piston 15 to cause the piston 15 to move to the left and swing the arm 16 in a clockwise direction and open the valve 13. In a similar manner, energization of the coil 28 more than the coil 27 will cause the valve members 21, 22 to move to the left to allow fluid under pressure to flow from the intake 23 through the conduit 18 into the cylinder 17 on the left side of the piston 15 to move the piston 15 to the right, move the arm 16 in a counter-clockwise direction and close the valve 13.

The coils 27, 28 are connected to output terminals 29, 30 and 31 of an amplifier 32 having a pair of input terminals 33 and 34.

The terminal 33 is connected through a signal-modifying circuit generally designated by reference numeral 35 and through a resistor 36 to one terminal 37 of a load sensing system 38 having a second output terminal 39 connected to an output terminal 40 of a speed sensing system generally designated by reference numeral 41, the speed sensing system 41 having a second output terminal 42 connected to the input terminal 34 of the amplifier 32. The load sensing system 38 may have one input terminal 43 connected to an output terminal 44 of the alternator 10 and a second input terminal 45 connectable through a switch contact 46 to a terminal 47 of a load 48 having terminals 49 and 50 connectable through contacts 51 and 52 to other output terminals 53 and 54 of the alternator 10.

In the general operation of the sytem, the load sensing system 38 provides an output signal which is indicative of the power flowing from the alternator 10 to the load and the speed sensing 41 provides an output signal of plurality and magnitude dependent upon the direction and amount of deviation of alternators speed from a set speed. The two signals are combined and amplified and applied to the coils 27, 28 to control the position of the valve 13 and maintain a constant speed at any given value of load. If only one alternator is used in a system, the load sensing system 38 would not be required. However, if it is desirable to parallel a plurality of alternators, it is desirable to provide a drooping speed-load characteristic which may be achieved through the provision of the load sensing system 38.

The speed sensing system 41 is arranged to respond to an alternating current signal derived from the alternator 10, either directly therefrom, or from a generator 54 driven by the alternator 10. Resonant circuit means 55 and 56 are provided which may comprise transformers 57 and 58 having primaries 59 and 60 connected in series and to the output terminals of the generator 54. The transformers 57 and 58 also have secondaries 61 and 62 with capacitors 63 and 64 connected thereacross to provide series resonant circuits. One resonant circuit may have a resonant frequency above the desired frequency and the other circuit may have a resonant frequency below the desired frequency with the output of the two circuits being equal at the desired frequency. For example, if the desired frequency is 400 cycles per second, one circuit may be tuned to 350 cycles and the other to 510 cycles, with the outputs being equal at 400 cycles. The outputs of the resonant circuits 55 and 56 are applied to full wave bridge rectifiers 65 and 66 with the output of the rectifier 65 being connected between the terminal 40 and a terminal 67 and with the output of the rectifier 66 being connected between the terminal 67 and the terminal 42. A capacitor 68 and a resistor 69 are connected between the terminals 40, 67 and a capacitor 70 and a resistor 71 are connected between the terminals 67 and the terminal 42 to provide a load and filter for the rectifiers 65, 66.

To obtain a high response speed without encountering overshoots and oscillations in normal operation, a displacement sensing system generally designated by reference numeral 72 is provided. The system 72 may comprise an elongated slug 73, which may be of magnetic material coupled to the piston 15 and guided for movement by means such as a tube 74 of non-magnetic material. In a neutral position of the slug 73, such as the position illustrated, the slug 73 is centered with respect to a coil 75 with one end portion of the slug 73 adjacent a coil 76 and with the other end portion thereof being adjacent a coil 77. The arrangement is such that the inductive coupling between the coil 75 and coil 76 is equal to the coupling between the coil 75 and the coil 77 with the slug 73 in its neutral position but with movement of the slugs 73 in one direction as for example, to the left as viewed in the drawing, the coupling between coil 75 and 76 will be increased while the coupling between the coil 75 and 77 is decreased. Similarly with movement of the slug 73 to the right the coupling between the coil 75 and 76 will be decreased while the coupling between the coil 75 and 77 is increased.

The coil 75 may be coupled to a source of alternating current indicated diagrammatically by reference numeral 78 which source may preferably be derived from the output of the alternator 10. Accordingly, the coils 76 and 77 will have outputs varying in inverse relation with displacement of the slug 73.

The voltages developed across coils 76 and 77 could be combined directly to obtain a voltage indicative of displacement of the slug 73. However, the phase relation of the voltages developed across the coil 76 and 77 with respect to each other and with respect to the voltage applied to the coil 75 may vary with displacement of the slug 73 and if the voltages were combined directly, it would be difficult to obtain a true reliable indication of the displacement of the slug 73. Further, it has been found desirable to use direct current for control purposes and it is necessary to rectify the voltages obtained from the coils 76 and 77 before they are applied to the input of an amplifier.

It has therefore been found desirable to employ separate rectifier means 79 and 80 for the voltage that develops across the coils 76 and 77. Each of the rectifier means 79 and 80 is preferably a full wave rectifier, with selenium elements, to increase the response speed. The outputs of the rectifier means 79 and 80 are filtered by means of a resistor-capacitor combination 81, 82 and a similar combination 83, 84 and are connected in opposition to each other with the differential between the outputs being developed between a circuit point 85 and a circuit point 86.

To obtain proportional plus integral control, the circuit point 85 is connected to an input terminal 87 of the amplifier 32 through a capacitor 88 with the circuit point 86 being directly connected to a terminal 89 of the amplifier 32. A resistor 90 may, if desired, be also connected between the circuit point 85 and the terminal 87. The capacitor 88 together with the input impedance of the amplifier 32 forms a differentiating circuit by which a proportional control action is obtained for transient signals, in combination with an integral or speed-resetting action.

The system thus far described will rapidly and accurately return the alternator speed to the correct speed with any small deviation from the correct speed such as might arise from a change in input pressure, load, etc. However, as previously pointed out, it is not as efficient as would be desirable during starting conditions.

According to an important feature of this invention, means are provided for maintaining the valve 13 in an open or maximum torque position until the alternator 10 is accelerated to a speed somewhat below the set speed, so as to achieve maximum acceleration. In particular, the right side of the coil 27 is connected directly to a terminal 91 and the left side of the coil 27 is connected to a resistor 92 to a fixed contact 93 engaged by a movable contact 94 which is connected to a terminal 95. The terminals 91 and 95 may be connected to a suitable source, such as a source of 28 volt D.-C. current as is conventionally available in many types of aircraft, the source being indicated diagrammatically by a battery 95*a*.

When the contact 94 is engaged with the contact 93, the coil 27 will be energized to an extent sufficient to maintain the valve members in a position displaced to the right from the position shown with the portion of the cylinder to the right of the piston 15 in communication with fluid under pressure from the inlet 23 to maintain the valve 13 in an open position.

Means are provided for disconnecting the coil 27 from the source connected to the terminals 91, 95 and a speed somewhat below the desired alternator speed. For this purpose, a suitable speed-responsive actuator such as a centrifugal actuator 96 is connected to the alternator and to the movable contact 94 as diagrammatically illustrated. The speed at which the actuator 96 should be set to disengage the contacts 93, 94 will depend upon the maximum expectable input pressure and the desired acceleration of the alternator. If, with low input pressures, the actuator disengages the contacts 93, 94 at too low a speed, the turbine may cease to accelerate the alternator to remain under speed, or might even decelerate. On the other hand, if under high input pressure conditions, the contacts 93, 94 disengaged at too high a speed, severe overspeed transients can occur. In general, the actuator 96 may be set to open the contacts 93, 94 at a speed of from 70 to 90 percent of the desired alternator speed. In a particular aircraft installation in which the alternator operates at 400 cycles per second, the actuator 96 was set to disengage the contacts 93, 94 at a speed corresponding to 315 cycles per second.

According to a further important feature of the invention, means are provided for utilizing proportional control action only in the starting operation, followed by the combination proportional plus integral control. For this purpose, one side of the capacitor 88 is connected to a fixed contact 97 arranged to be engaged by a movable contact 98 operated by the actuator 96, the movable contact 98 being connected to a fixed contact 99 engaged by a movable relay contact 100 connected to the other side of the capacitor 88. The movable contact 100 is normally engaged with the contact 99 but is disengaged by energization of a time-delay relay coil 101 a certain time interval after such a coil 101 is energized. One side of the coil 101 is connected to the terminal 91 and the other side is connected to a movable contact 102 actuated by the actuator 96 into engagement with a fixed contact 103 connected to the terminal 95.

In operation, the centrifugal actuator 96 operates at a certain alternator speed below the set speed as above described, to short out the capacitor 88 and energize the relay coil 101. With the capacitor 88 shorted out, proportional action will be obtained and the alternator will be accelerated to a speed close to the desired speed. Upon the lapse of a certain delay period, for example 3 seconds, the movable contact 100 will be moved out of engagement with the contact 99 to remove the short across the capacitor 88, so as to obtain proportional plus integral control action.

According to another important feature of the invention, means are provided for decreasing the response of the system to speed sense signals indicative of underspeed while obtaining high response to speed sensing signals indicative of overspeed. For this purpose, the signal modifying circuit 35 comprises a rectifier in the form of a series-connected diode 104 so polarized as to block underspeed signals while conducting overspeed signals. To obtain conduction of underspeed signals to a certain extent, a resistor 105 is connected in parallel with diode 104. It will be appreciated that with this cricuit, the alternator may be accelerated toward the desired speed at a much more rapid rate, without increasing the possibility of overspeed transients.

It is, of course, desirable to have substantially equal response to underspeed and overspeed signals after the alternator is accelerated to the desired speed and for this purpose, one side of the diode 104 is connected to a fixed contact 106 engaged by a movable contact 107 a certain time period after the relay coil 101 is energized, the movable contact 107 being connected to the other side of the diode so as to short out the diode.

It will, accordingly, be appreciated that this invention provides an alternator drive system in which the alternator may be rapidly accelerated to the desired speed without overspeed transients and without interfering with the accurate control of alternator speed under normal conditions.

It will be understood that modifications and variations may be effected without departing from the spirit and the scope of the novel concepts of the present invention.

I claim as my invention:

1. In a drive system for an alternator or the like, a movable element for regulating drive torque applied to the alternator, an electro-mechanical transducer for controlling movement of said element, means for controlling said transducer in accordance with a control signal, displacement sensing means having an output varying in polarity and magnitude in accordance with amount and direction of displacement of said element from a neutral position, means for coupling said output of said sensing means to said transducer and selectively actuatable for obtaining proportional control and combined proportional plus integral control, and means coupled to the alternator for controlling said coupling means to obtain proportional control only during starting conditions and thereafter proportional plus integral control.

2. In a drive system for an alternator or the like, a movable element for regulating drive torque applied to the alternator, an electro-mechanical transducer for controlling movement of said element, means for regulating said transducer in accordance with alternator speed to tend to maintain a certain alternator speed, and means coupled to the alternator and said transducer means for effective movement of said element to a maximum torque position at alternator speeds below a certain value.

3. In a drive system in an alternator or the like, a movable element for regulating drive torque applied to the alternator, an electro-mechanical transducer for controlling movement of said element, speed sensing means coupled through the alternator for developing an output signal of one polarity with speeds greater than a certain speed and an output signal of the reverse polarity with speeds less than such certain speed, amplifier means having an output coupled to said transducer means and an input coupled to said output signals, and means for decreasing the response of the system to said output signal of the reverse polarity relative to said output signal of said one polarity.

4. In a drive system for an alternator or the like, a movable element for regulating drive torque applied to the alternator, an electro-mechanical transducer for controlling movement of said element, displacement sensing means having an output varying in polarity and magnitude in accordance with direction and amount of displacement of said element from a neutral position, means including a differentiating circuit for connecting the output of said displacement sensing means to said transducer, and means for disabling the differentiating circuit during starting of the alternator.

5. In a drive system for an alternator or the like, a movable element for regulating drive torque applied to the alternator, an electro-mechanical transducer for controlling movement of said element, displacement sensing means having an output varying in accordance with displacement of said element, amplifier means having an output connected to said transducer, a first input arranged to be coupled to a control signal and a second input, means including a series capacitor connecting said output of said displacement sensing means to said second input of said amplifier means, and means coupled to the alternator for automatically shorting said capacitor during starting of the alternator.

6. In a drive system for an alternator or the like, a movable element for regulating drive torque applied to the alternator, an electro-mechanical transducer for controlling movement of said element, speed sensing means coupled to said transducer and arranged to respond to alternating current signal frequency proportional to alternator speed, and means coupled to the alternator and said transducer means for effecting movement of said element to a maximum torque position at alternator speeds below a certain value.

7. In a drive system in an alternator or the like, a movable element for regulating drive torque applied to the alternator, an electro-mechanical transducer for controlling movement of said element, speed sensing means coupled through the alternator for developing an output signal of one polarity with speeds greater than a certain speed and an output signal of the reverse polarity with speeds less than such certain speed, amplifier means having an output coupled to said transducer means and an input coupled to said output signals, and means including rectifier means for decreasing the response of the system to said output signal of the reverse polarity relative to said input signal of said one polarity.

8. In a drive system for an alternator or the like, a movable element for regulating drive torque applied to the alternator, an electro-mechanical transducer for controlling movement of said element, speed sensing means coupled to the alternator for developing an output signal of one polarity with speeds greater than a certain speed and an output signal of the reverse polarity with speeds less than such certain speed, amplifier means having an output coupled to said transducer means and an input coupled to said output signals, and means coupled to said transducer means for effecting movement of said element to a maximum torque position at alternator speeds below a certain value which is less than said certain speed.

9. In a drive system for an alternator or the like, a movable element for regulating drive torque applied to the alternator, an electro-mechanical transducer for controlling movement of said element, speed sensing means coupled to the alternator for developing an output signal of one polarity with speeds greater than a certain speed and an output signal of the reverse polarity with speeds less than such certain speed, amplifier means having an output coupled to said transducer means and an input coupled to said output signals, means coupled to said transducer means for effecting movement of said element to a maximum torque position at alternator speeds below a certain value which is less than said certain speeds, and control means for decreasing the response of the system to said output signal of the reverse polarity relative to said output signal of said one polarity.

10. In a drive system for an alternator or the like, a movable element for regulating drive torque applied to the alternator, an electro-mechanical transducer for controlling movement of said element, speed sensing means coupled to the alternator for developing an output signal of one polarity with speeds greater than a certain speed and an output signal of the reverse polarity with speeds less than such certain speed, amplifier means having an output coupled to said transducer means and an input coupled to said output signals, means coupled to said transducer means for effecting movement of said element to a maximum torque position at alternator speeds below a certain value which is less than said certain speed, control means for decreasing the response of the system to said output signal of the reverse polarity relative to said output signal of said one polarity, and means for rendering said control means ineffective after alternator speed reaches certain value.

11. In a drive system for an alternator or the like, a movable element for regulating drive torque applied to the alternator, an electro-mechanical transducer for controlling movement of said element, speed sensing means coupled to the alternator for developing an output signal of one polarity with speeds greater than a certain speed and an output signal of the reverse polarity with speeds less than such certain speed, amplifier means having an output coupled to said transducer means and an input coupled to said output signals, means coupled to said transducer means for effecting movement of said element to a maximum torque position at alternator speeds below a certain value which is less than said certain speed, and means for rendering said control means ineffective at the lapse of a certain time period after alternator speed reaches such certain value.

12. In a drive system for an alternator or the like, a movable element for regulating drive torque applied to the alternator, an electro-mechanical transducer for controlling movement of said element, switch means for applying a signal to said transducer for effecting movement of said element to a maximum torque position, and an alternator speed-responsive actuator coupled to said switch means for moving said switch means to an inoperative position when alternator speed reaches a certain value.

13. In a drive system for an alternator or the like, a movable element for regulating drive torque applied to the alternator, an electro-mechanical transducer for controlling movement of said element, displacement sensing means having an output varying in accordance with displacement of said element, means coupling said displacement sensing means to said transducer and selectively actuatable to obtain proportional and proportional plus integral control action, a speed-responsive actuator coupled to the alternator, and a time delay relay actuated by said actuator when a certain speed less than the desired alternator speed is reached and arranged to change said control means from proportional control to proportional plus integral control upon the elapse of a certain time interval after said certain speed is reached.

14. In a drive system for an alternator or the like, a movable element for regulating drive torque applied to the alternator, an electro-mechanical transducer for controlling movement of said element, speed sensing means coupled to alternator for developing an output signal of one polarity with speeds greater than a certain speed and an output signal of the reverse polarity with speeds less than such certain speed, amplifier means having an output coupled to said transducer and an input coupled to said output signals, control means for decreasing the response of the system to said output signal of the reverse polarity relative to said output signal of said one polarity, a speed-responsive actuator coupled to the alternator, and a time delay relay actuated by said actuator, when a predetermined speed less than said certain speed is reached and arranged to disable said control means upon the elapse of a certain time interval after said predetermined speed is reached.

15. In a drive system for an alternator or the like, a movable element for regulating drive torque applied to the alternator, an electro-mechanical transducer for controlling movement of said element, displacement sensing means having an output varying in accordance with displacement of said element, means coupling said displacement sensing means to said transducer and selectively actuatable to obtain proportional control action and proportional plus integral control action, means coupled to the alternator and to said coupling means and means to change said coupling means from proportional control action to proportional plus integral control action after starting of the alternator, and means for moving said element to a maximum torque position until a certain speed less than the desired speed is reached.

16. In a drive system for an alternator or the like, a movable element for regulating drive torque applied to the alternator, an electro-mechanical transducer for controlling movement of said element, speed sensing means coupled to the alternator for developing an output signal of one polarity with speeds greater than a certain speed and an output signal of the reverse polarity with speeds less than such certain speed, amplifier means having an output coupled to said transducer and an input coupled to said output signals, control means for decreasing the response of the system to said output signal of the reverse polarity relative to said output signal of one polarity, displacement sensing means having an output varying in accordance with displacement of said element, coupling means between said displacement sensing means and said transducer being actuatable for obtaining proportional control action and proportional plus integral action, and means for disabling said control means and changing said coupling means from proportional control action to proportional plus integral control action after the alternator is accelerated to a speed close to the desired speed of operation.

17. In a drive system for an alternator or the like, a movable element for regulating drive torque applied to the alternator, an electro-mechanical transducer for controlling movement of said element, speed sensing means coupled to the alternator for developing an output signal of one polarity with speeds greater than a certain speed and an output signal of the reverse polarity with speeds less than such certain speed, amplifier means having an output coupled to said transducer and an input coupled to said output signals, control means for decreasing the response of the system to said output signal of the reverse polarity relative to said output signal of one polarity, displacement sensing means having an output varying in accordance with displacement of said element, coupling means between said displacement sensing means and said transducer being actuatable for obtaining proportional control action and proportional plus integral action, means for disabling said control means and changing said coupling means for proportional control action to proportional plus integral control action after the alternator is accelerated to a speed close to the desired speed of operation, and means for effecting movement of said element to a maximum torque position at alternator speeds below a certain value which is less than the desired speed of operation.

References Cited in the file of this patent

UNITED STATES PATENTS

| | | |
|---|---|---|
| 2,157,834 | Schmidt | May 9, 1939 |
| 2,496,730 | Lindbeck et al. | Feb. 7, 1950 |
| 2,558,729 | Buechler | July 3, 1951 |